United States Patent
Jeon et al.

(10) Patent No.: US 11,595,090 B2
(45) Date of Patent: *Feb. 28, 2023

(54) METHOD FOR GENERATING PRECODER IN MULTI USER MULTIPLE INPUT AND MULTIPLE OUTPUT COMMUNICATION SYSTEM

(71) Applicant: SAMSUNG ELECTRONICS CO., LTD., Suwon-si (KR)

(72) Inventors: Eun Sung Jeon, Seoul (KR); Min Ki Ahn, Seoul (KR); Wook Bong Lee, San Jose, CA (US); Sung Soo Kim, Seoul (KR); Joon Suk Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,194

(22) Filed: Jan. 6, 2022

(65) Prior Publication Data
US 2022/0131581 A1 Apr. 28, 2022

Related U.S. Application Data

(63) Continuation of application No. 16/814,275, filed on Mar. 10, 2020, now Pat. No. 11,233,552.

(30) Foreign Application Priority Data

Jul. 23, 2019 (KR) .................. 10-2019-0088813

(51) Int. Cl.
*H04B 7/0456* (2017.01)
*H04B 7/06* (2006.01)
(Continued)

(52) U.S. Cl.
CPC ......... *H04B 7/0486* (2013.01); *H04B 7/0452* (2013.01); *H04B 7/0634* (2013.01); *H04B 17/336* (2015.01); *H04L 1/0003* (2013.01)

(58) Field of Classification Search
CPC .. H04B 7/0486; H04B 7/0452; H04B 7/0634; H04B 17/336; H04B 7/0456; H04L 1/0003; H04L 1/0009
See application file for complete search history.

(56) References Cited

U.S. PATENT DOCUMENTS 8,135,092 B2 3/2012 Kim
8,306,142 B2 11/2012 Ariyavisitakul
(Continued)

FOREIGN PATENT DOCUMENTS

WO 2006054249 5/2006

OTHER PUBLICATIONS

Sung, et al., "Generalized Channel Inversion Methods for Multiuser MIMO Systems", IEEE Transactions on Communications, vol. 57, No. 11, Nov. 2009, pp. 3489-3499.

*Primary Examiner* — Vineeta S Panwalkar
(74) *Attorney, Agent, or Firm* — F. Chau & Associates, LLC

(57) ABSTRACT

Provided is method for generating a precoder in a Multi User Multiple Input and Multiple Output (MU MIMO) communication system. The method involves receiving channel information and quality information of a channel from a plurality of stations. It is determined whether a first condition is satisfied on the basis of the received information, if so, a type of matrix inversion is selected from among a plurality of matrix inversion types for precoding. It is determined whether a second condition is satisfied on the basis of the provided information, and a type of decomposition from a plurality of decomposition types for precoding (Continued)

is selected if the second condition is satisfied. A precoder is generated on the basis of the selected result.

20 Claims, 13 Drawing Sheets

(51) Int. Cl.
*H04B 17/336* (2015.01)
*H04L 1/00* (2006.01)
*H04B 7/0452* (2017.01)

(56) References Cited

U.S. PATENT DOCUMENTS

| | | |
|---|---|---|
| 8,687,715 B2 | 4/2014 | Kent et al. |
| 10,181,882 B2 | 1/2019 | Wang et al. |
| 2007/0280116 A1 | 12/2007 | Wang et al. |
| 2009/0034639 A1 | 2/2009 | Hwang et al. |
| 2011/0075752 A1 | 3/2011 | Zheng et al. |
| 2014/0086368 A1 | 3/2014 | Yokote |
| 2021/0028836 A1 | 1/2021 | Jeon et al. |

FIG. 9

| MCS | Modulation | Code Rate | SVD-GMD |
|---|---|---|---|
| 0 | BPSK | 1/2 | GMD |
| 1 | QPSK | 1/2 | GMD |
| 2 | QPAK | 3/4 | GMD |
| 3 | 16-QAM | 1/2 | SVD |
| 4 | 16-QAM | 3/4 | GMD |
| 5 | 64-QAM | 2/3 | SVD |
| 6 | 64-QAM | 3/4 | GMD |
| 7 | 64-QAM | 5/6 | GMD |
| 8 | 256-QAM | 3/4 | SVD |
| 9 | 256-QAM | 5/6 | GMD |
| 10 | 1024-QAM | 3/4 | SVD |
| 11 | 1024-QAM | 5/6 | GMD |

FIG. 10

| SNR | SVD-GMD | Data Rate |
|---|---|---|
| 0 | SVD | Rate0_SVD |
|   | GMD | Rate0_GMD |
| 1 | SVD | Rate1_SVD |
|   | GMD | Rate1_GMD |
| ... | ... | ... |
| K-1 | SVD | Rate(K-1)_SVD |
|   | GMD | Rate(K-1)_GMD |
| K | SVD | Rate(K)_SVD |
|   | GMD | Rate(K)_GMD |

METHOD FOR GENERATING PRECODER IN MULTI USER MULTIPLE INPUT AND MULTIPLE OUTPUT COMMUNICATION SYSTEM

CROSS REFERENCE TO RELATED APPLICATIONS

This application is a continuation under 35 U.S.C. 120 of U.S. patent application Ser. No. 16/814,275, filed Mar. 10, 2020, which claims priority from Korean Patent Application No. 10-2019-0088813 filed on Jul. 23, 2019 in the Korean Intellectual Property Office, the disclosures of which are incorporated herein by reference in their entireties.

TECHNICAL FIELD

Embodiments of the inventive concept relate to a method and apparatus for generating a precoder in a multi user multiple input and multiple output communication system.

DESCRIPTION OF THE RELATED ART

An access point (AP) may transmit a sounding packet, which is a test packet often called a Null Data Packet (NDP), to a station to acquire channel information for beamforming transmission. The station that receives the sounding packet decodes it using a multiple reception antenna (an antenna array), and may feed back various information based on the sounding packet to the access point. Such feedback information may include transmit channel information converted into an angular form for each sub carrier; and quality information (e.g., a signal to noise ratio (SNR) value) or the like for each stream and for each sub carrier.

The access point may determine a modulation and coding scheme (MCS) and the number of streams, using a stream average SNR, and/or an SNR for each sub carrier or the like received/determined through the feedback, and may form a precoder, using the channel information.

Incidentally, for example, when a condition number of a spatial channel in a communication system that supports only the same MCS for each stream is large, that is, when a singular value difference for each stream is large, a phenomenon may occur in which many packet errors undesirably occur in the last stream. The abundance of packet errors may result in poor quality/lost communication.

SUMMARY

Aspects of the present inventive concept provide a method for generating a precoder capable of reducing a packet error rate (PER) and improving reliability of data communication.

According to an aspect of the present inventive concept, there is provided a method for generating a precoder of a multi user multiple input and multiple output (MU MIMO) communication system. In the method, channel information and quality information of a channel is received from a plurality of stations. It is determined whether a first condition is satisfied on the basis of the provided information, and a type of matrix inversion type among a plurality of matrix inversion types for precoding is selected if the first condition is satisfied. It is determined whether a second condition different from the first condition is satisfied on the basis of the provided information, and a type of decomposition among a plurality of decomposition types for precoding is selected if the second condition is satisfied. A precoder is generated on the basis of the selected result. The method may be performed through use of at least one processor executing instructions to carry out the various operations.

According to another aspect, there is provided a method for generating a precoder of a multi user multiple input and multiple output communication system, the method comprises receiving channel information and quality information of a channel from a plurality of stations to determine the number of streams to be provided to the plurality of stations, and determining a generating method of an inversion matrix required or desirable for generation of the precoder on the basis of interference canceling capability information of the plurality of stations, if it is determined that a rank reduction is required or desirable on the basis of the determined number of streams. The method may be performed through use of at least one processor executing instructions to carry out the various operations.

According to still another aspect, there is provided a method for generating a precoder of a multi user multiple input and multiple output communication system, the method comprises receiving channel information and quality information of a channel from a plurality of stations, determining the number of streams to be provided to the plurality of stations, and a modulation and coding scheme (MCS), on the basis of the received information, and determining a composition type to be used for generation of the precoder, on the basis of at least one of the quality information of the channel and the modulation and coding scheme, if it is determined that a plurality of streams needs to be or should be allocated to any one of the plurality of stations. The method may be performed through use of at least one processor executing instructions to carry out the various operations.

An access point for communicating with a plurality of stations in a MU MIMO communication system may include a processor that executes instructions read from a memory to carry out any of the methods outlined above.

BRIEF DESCRIPTION OF THE DRAWINGS

The above and other aspects and features of the inventive concept will become more apparent by describing in detail exemplary embodiments thereof with reference to the attached drawings, in which:

FIGS. 9 and 10 are respective diagrams for explaining a decomposition method selection process of FIG. 3;

DETAILED DESCRIPTION OF EMBODIMENTS

Figure 1:
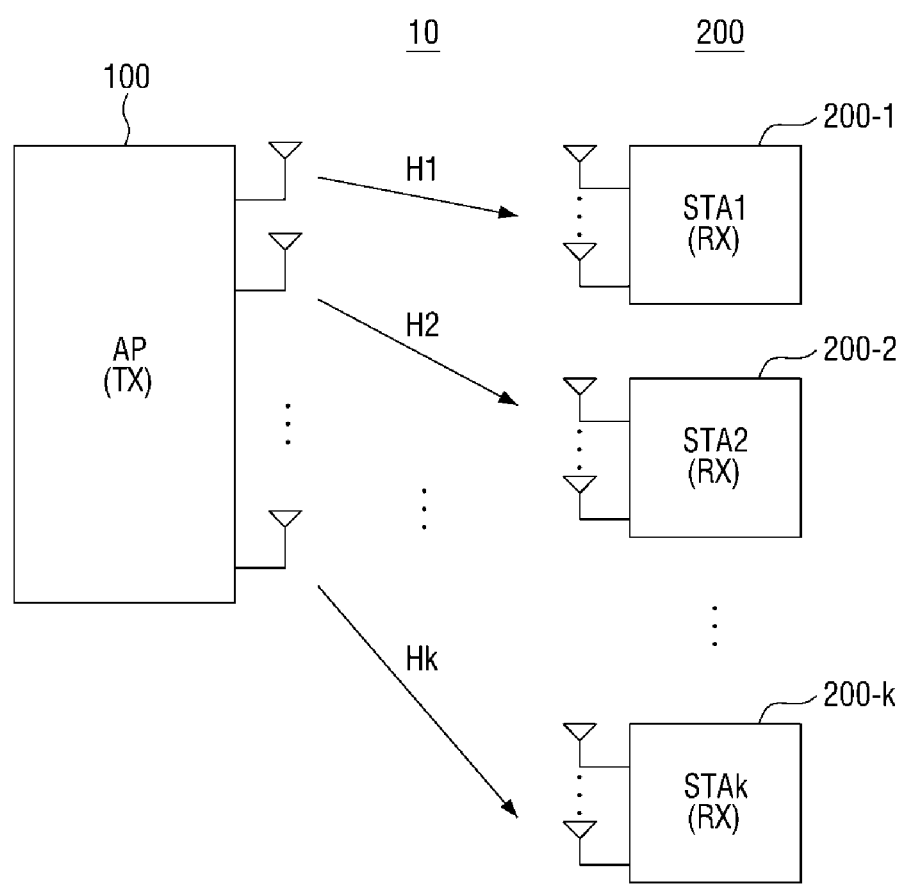
FIG. 1 is a conceptual block diagram of a multi user multi-input multi-output communication system.

Embodiments according to the technical idea of the inventive concept will be described below with reference to the accompanying drawings in which like reference characters indicate like elements or features.

Figure 2:
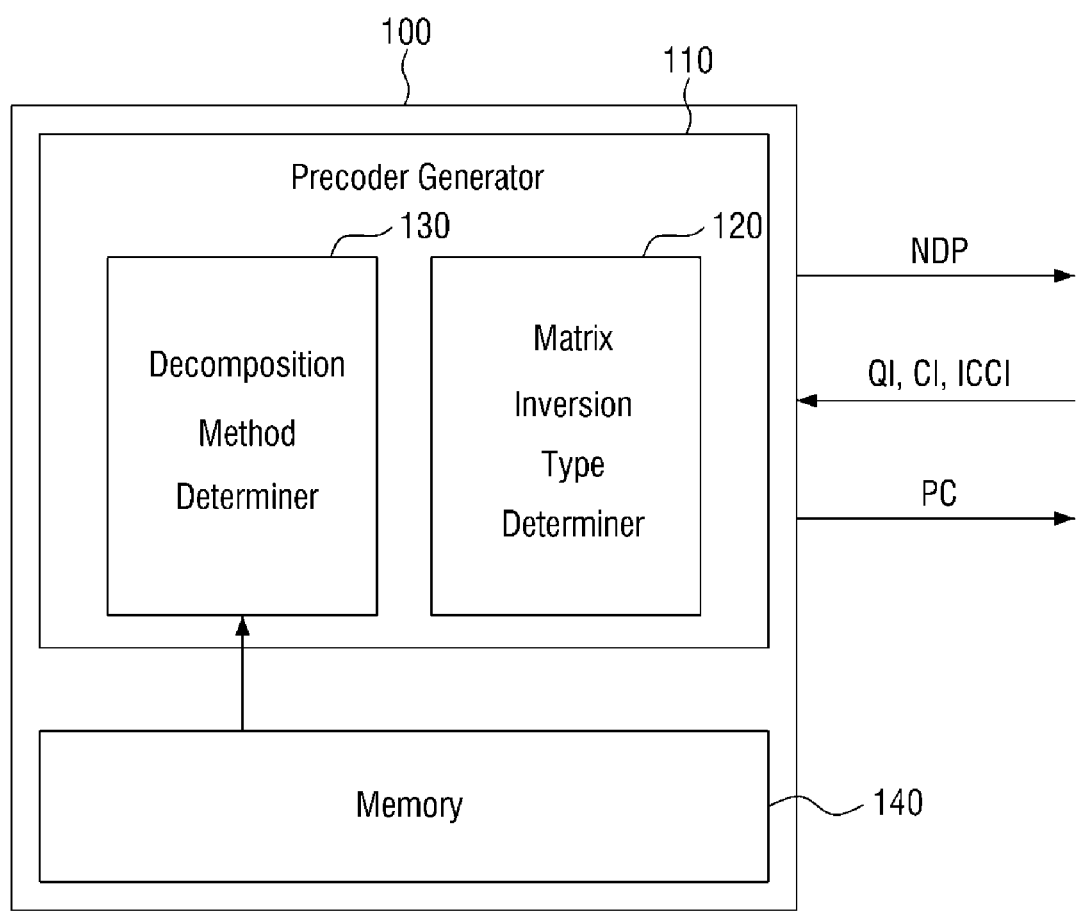
FIG. 2 is a conceptual block diagram of a precoder generator included in an access point of FIG. 1.

FIG. 1 is a conceptual block diagram of a multi user multi-input multi-output (MU MIMO) wireless communication system 10. FIG. 2 is a conceptual block diagram of a precoder generator included in an access point of FIG. 1.

Referring to FIGS. 1 and 2, the wireless communication system 10 may include an access point 100 and a plurality of stations 200-1 to 200-k. The access point 100 has a plurality of antennas, and each of the stations 200-1 to 200-k also has a plurality of antennas. The wireless communication system 10 is considered a MU MIMO type system, in which each of the plurality of stations 200-1 to 200-k communicates with the access point 100 through the respective plurality of antennas on both sides. The AP 100 may simultaneously communicate multiple data streams (hereafter, "streams") the stations 200-1 to 200-k, collectively or individually. Herein, the term "communicate" refers to transmitting and/or receiving signals. The plurality of stations 200-1 to 200-k will hereafter be referred to interchangeably as just "the stations 200". Any station among the stations 200 may be referred to as a station 200-i or a station 200-j.

In some embodiments, the wireless communication system may be, for example, a wireless local area network (WLAN) system that supports only the same modulation and coding scheme for each stream. In other examples the wireless communication system may be an LTE (Long Term Evolution) system, a CDMA (Code Division Multiple Access) system, a GSM (Global System for Mobile Communications) system, or any other wireless communication system.

The access point 100 may include a plurality of transmit ("transmission") antennas, and each of the stations 200 may also include a plurality of receive ("reception") antennas. Any transmit antenna may also be shared for use as a receive antenna, and vice versa, if suitable transmit/receive switching or other means is provisioned to separate the transmit/receive signals.

The stations 200 may each be any of various devices that may communicate with the access point 100 to transmit and receive data and/or control information. Some examples of the stations 200 include UE (User Equipment), a MS (Mobile Station), a MT (Mobile Terminal), a UT (User Terminal), a SS (Subscribe Station), a mobile device, and the like. The access point 100 may also be called a fixed station that communicates with the stations 200 and/or other base stations, and may communicate with the stations 200 or other base stations to transmit and receive the data.

For example, the access point 100 may be called a Node B, an eNB (evolved-Node B), a BTS (Base Transceiver System), or the like.

The wireless communication network 10 between the access point 100 and the stations 200 may support a large number of users to communicate by sharing available network resources. For example, in the wireless communication network 10, information may be transferred using in various multiple access techniques such as CDMA (code division multiple access), FDMA (frequency division multiple access), TDMA (time division multiple access), OFDMA (orthogonal frequency division multiple access), and SC-FDMA (single carrier frequency division multiple access).

The access point 100 and the stations 200 may communicate with each other through a MIMO channel. For example, the access point 100 and each of the stations 200-1 to 200-k may communicate with each other, using a channel coefficient or a channel matrix Hj (where j=1, . . . , k) between antennas. Here, it may be assumed that the channel coefficient or the channel matrix Hj (j=1, . . . , k) between antennas has a magnitude of a Rayleigh distribution, and a phase of a uniform distribution, and there is no antenna correlation.

A rank (rank, $Rank(H_j)$) is the number of streams capable of being transmitted in the wireless communication system, and may be smaller than or equal to the lower of the number of transmit antennas at the AP 100 or the number of antennas at each station. In general, the rank may be determined depending on a condition number of a spatial channel (a measure of how similar the paths of the spatial channel are), a spatial correlation of the transmit/receive antennas, and a transmittable resource of the access point 100.

For example, in a WLAN system, the access point 100 may determine the rank. Specifically, the access point 100 may transmit a sounding packet NDP to the stations 200 so that the stations 200 may transfer feedback according to the determined channel coefficient.

The stations 200 may feed back channel information (CI) converted into an angular form for each sub carrier, and quality information (QI, e.g., a signal to noise ratio (SNR) value) for each stream and for each sub carrier to the access point 100, in accordance with the channel coefficient or the channel matrix specified by the sounding packet NDP.

In some embodiments, the stations 200 may also provide interference canceling capability information (ICCI) of the stations 200 to the access point 100.

Or, the access point 100 may know the ICCI of the stations 200 in advance. The ICCI of the stations 200 may be used to select a matrix inversion type, i.e., a type of matrix inversion from among a plurality of matrix types for precoding, which will be described later.

The access point 100 provided with channel information (CI) and quality information (QI) of channel from the stations 200 may determine the number of streams to be assigned to the respective stations 200-1 to 200-k, and the transmission modulation and the coding scheme (MCS), using the quality information (QI) of the channel. Further, the access point 100 may generate a precoder for each sub carrier, using channel information (CI) for each sub carrier.

In some embodiments, although such a process may be performed by the precoder generator 110 of the access point 100, the process may be alternatively implemented by processing circuitry located elsewhere. It is also noted that a precoder generator 110 may be a link adaptor or a partial component of the link adaptor included in the access point 100, or may be a part of another processing component.

The precoder generator 110 may include a matrix inversion type determiner 120 and a decomposition method determiner 130. Herein, any determiner may be referred interchangeably as a determination circuit, and may be implemented with processing circuitry.

The matrix inversion type determiner 120 receives channel information (CI) and quality information (QI) of the channel from the stations 200, determines whether the first condition is satisfied on the basis of the provided information, and if the first condition is satisfied, the matrix inversion type determiner 120 may select the matrix inversion type necessary or desirable for generating the precoder PC.

In particular, in some embodiments, the matrix inversion type determiner 120 may receive channel information (CI) and quality information (QI) of the channel from the stations 200 to determine the number of streams to be provided to the stations 200, and may determine whether a rank reduction is required or desirable on the basis of the determined number of streams.

Here, a situation in which the rank reduction is required or desirable signifies a situation in which the number of streams allocated to the stations 200 by the access point 100 is smaller than the number of channel coefficients fed back to the access point 100 by the stations 200. Such a rank reduction situation may occur, for example, in a case where the signal to noise ratio (SNR) value of a channel fed back from the stations 200 is lower than a specific threshold value. In this case, the access point 100 may reduce the number of streams to be allocated to the stations 200 and attempt a transmission that is robust against packet errors.

If it is determined that there is a situation in which the rank reduction is required or desirable (i.e., if the first condition is satisfied), the matrix inversion type determiner 120 may select the matrix inversion type required for generating the precoder PC. A specific operation thereof will be described later.

The decomposition method determiner 130 receives channel information (CI) and quality information (QI) of the channel from the stations 200, and determines whether a second condition is satisfied on the basis of the provided information. If the second condition is satisfied, the decomposition method determiner 130 may select the decomposition type.

Specifically, in some embodiments, the decomposition method determiner 130 receives channel information (CI) and quality information (QI) of the channel from the stations 200 to determine the number of streams to be provided to the stations 200, and may determine whether at least some of the plurality of streams needs to be or should be assigned to any one of the stations 200. For example, the decomposition method determiner 130 may determine whether there is a multiple channel coefficient feedback situation in which two or more streams are assigned to the plurality of reception antennas of a j(j=1, 2, . . . , k)$^{th}$ station (200-$j$).

The decomposition method determiner 130 may determine a type of decomposition from among a plurality of decomposition types used for generating the precoder PC with reference to, for example, the memory 140, if it is determined that the plurality of streams need to be or should be allocated to any one of the stations 200 (i.e., if the second condition is satisfied). Specific operations thereof will also be described later.

Modeling of data signal for each sub carrier transmitted to the j(j=1, 2, . . . , k)$^{th}$ station (200-$j$) using the precoder PC generated by the access point 100 may be in accordance with Formula 1 below.

$$y_j = H_j P_j s_j + \underbrace{H_j \sum_{k \neq j}^{K} P_k s_k}_{\text{Other user interference}} + n_j \quad \langle\text{Formula 1}\rangle$$

Here, yj is the received signal of the j$^{th}$ station (200-$j$), Hj is a normalized channel matrix of the j$^{th}$ station (200-$j$), and Pj is a precoder (PC) matrix of the j$^{th}$ station (200-$j$). Sj(k=j) is a data symbol or signal transmitted to the j$^{th}$ station (200-$j$), and Sj(k*j) is an interference signal transmitted to stations other than the j$^{th}$ station (200-$j$). Nj is thermal noise of CN(0,$\sigma_I^2$).

Also, $H_s = [H_1^T, \ldots, H_K^T]^T$ is defined as the total number of channels fed back to the access point 100. Here, $\|\sum_{j=1}^{K} P_j s_j\|_F^2 \leq P_{total}$ is established, and $P_{total}$ is a total transmission power. Also, it is assumed that $\sigma_I^2 = \sigma_w^2$ (j=1, 2, . . . , K).

Figure 3:
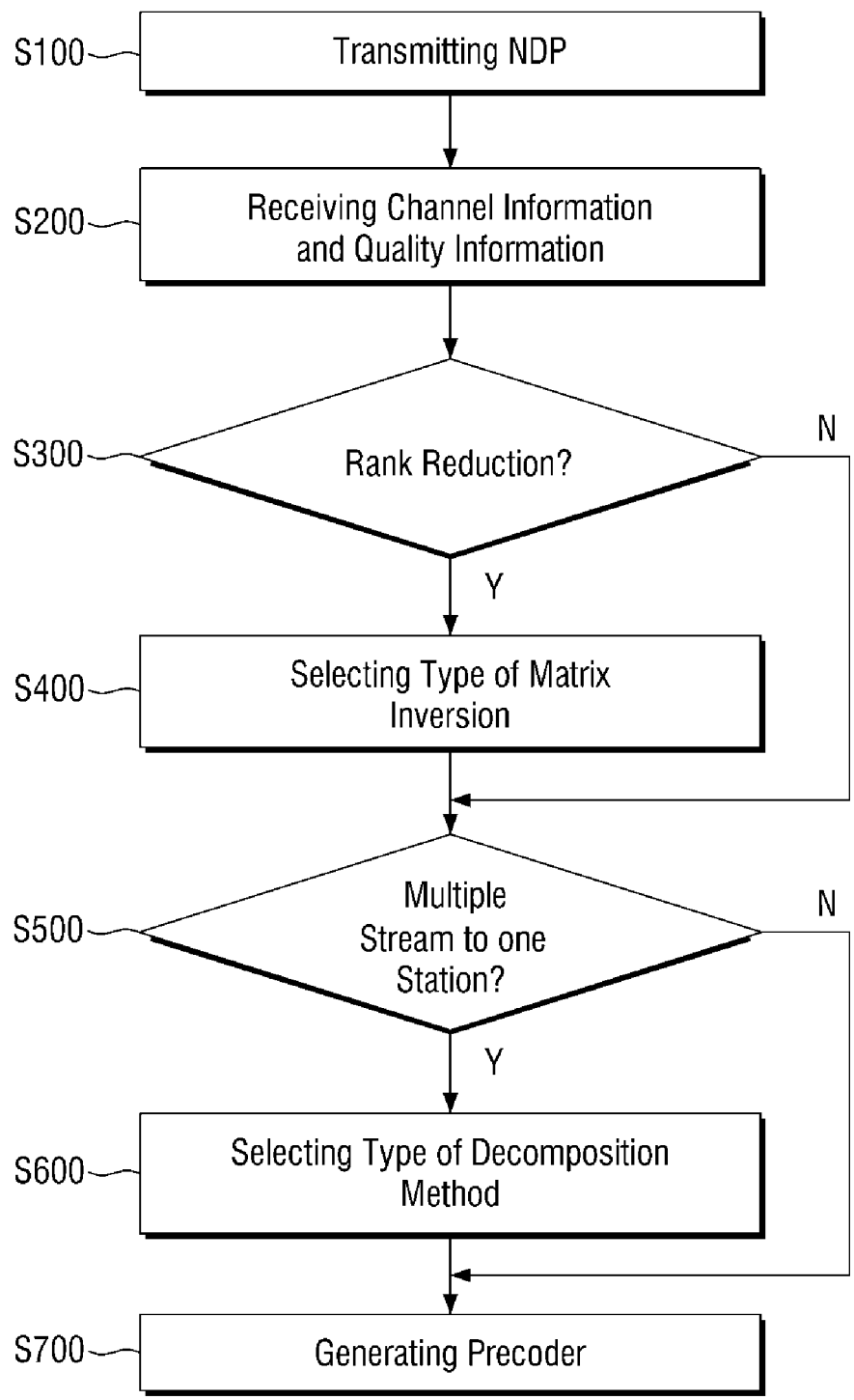
FIG. 3 is a flowchart for explaining a method for generating a precoder according to some embodiments.
Figure 4:
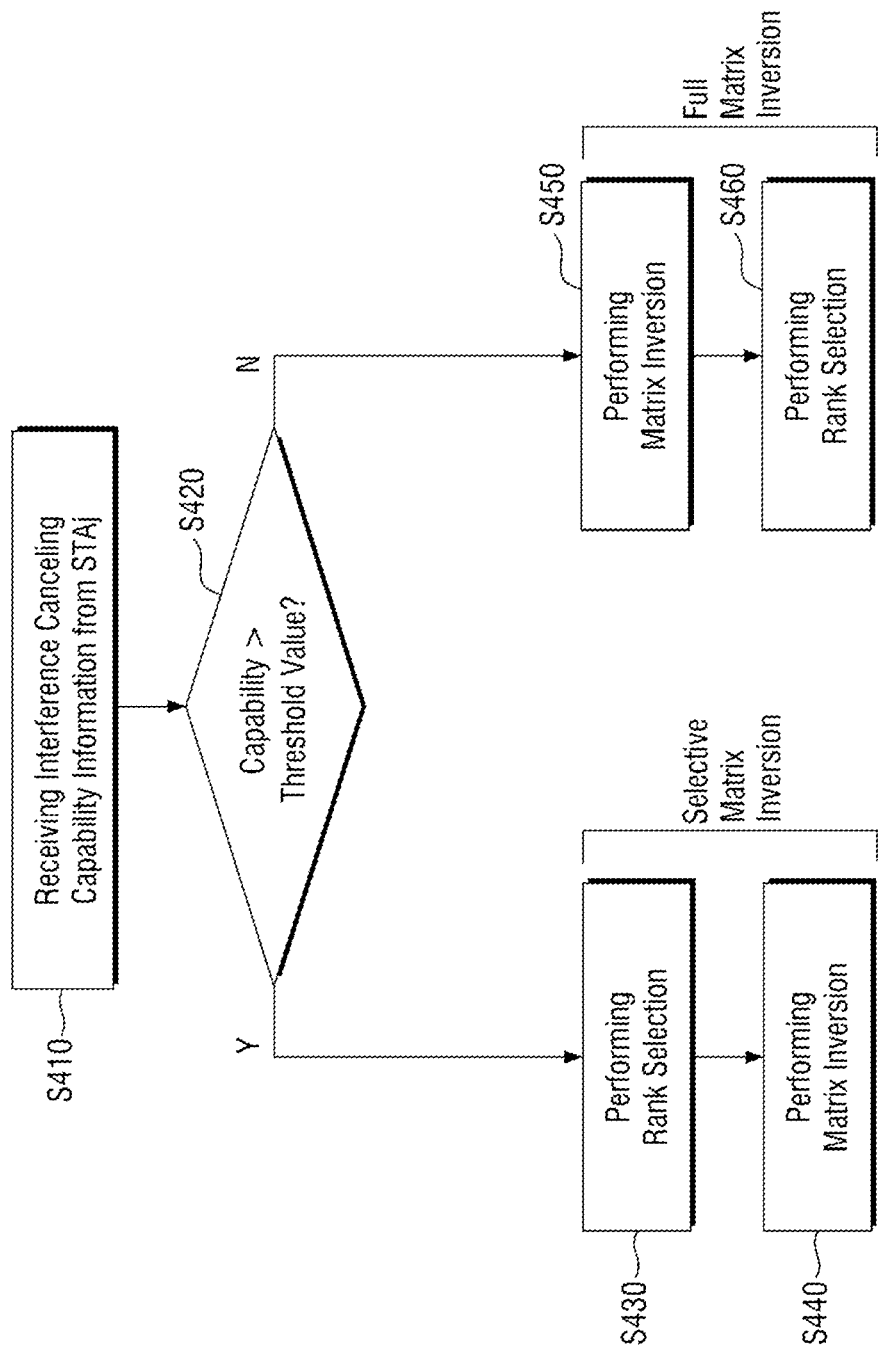
FIG. 4 is a flowchart for more specifically explaining a matrix inversion process of FIG. 3.

Hereinafter, an example method for generating a precoder according to some embodiments will be described. FIG. 3 is a flowchart for explaining the example method whereas FIG. 4 is a flowchart for explaining the matrix inversion process of FIG. 3 more specifically. FIGS. 5 to 8 are diagrams for explaining the matrix inversion process of FIG. 3. FIGS. 9 and 10 are diagrams for explaining a decomposition method selection process of FIG. 3. The method of FIG. 3 may be implemented by processors within AP 100 and/or stations 200 reading instructions from a respective memory.

First, referring to FIG. 3, a sounding packet is transmitted (S100).

For example, referring to FIGS. 1 and 2, the access point 100 may transmit the sounding packet NDP to the stations 200 so that stations 200 may transfer feedback in accordance with determined channel coefficient or channel matrix.

Thereafter, channel information and quality information of channel are received (S200).

For example, referring to FIGS. 1 and 2, the stations 200 may feed back the channel information (CI) converted into an angular form for each sub carrier, and quality information (QI) for each sub carrier for each stream, (e.g., a signal to noise ratio (SNR) value) to the access point 100, in accordance with a channel coefficient or a channel matrix specified by the sounding packet NDP.

Next, it is determined whether there is a situation in which a rank reduction is required or desirable (S300).

For example, referring to FIGS. 1 and 2, the matrix inversion type determiner 120 may receive channel information (CI) and quality information (QI) of the channel from the stations 200 to determine the number of streams to be provided to the stations 200, and may determine whether a rank reduction is required or desirable on the basis of the determined number of streams. Specifically, the matrix inversion type determiner 120 may determine whether the number of streams allocated to the stations 200 by the access point 100 is smaller than the number of channel coefficient(s) or channel matrices fed back to the access point 100 by the stations 200.

If the rank reduction is required or desirable (S300—Y), the matrix inversion type is selected (S400). If the rank reduction is not required or desirable (S300—N), the matrix inversion type selection process (S400) is not executed.

Hereinafter, the matrix inversion type selection process (S400) will be described more specifically with reference to FIG. 4.

Referring to FIG. 4, interference canceling capability information is provided from a plurality of stations (S410).

For example, referring to FIGS. 1 and 2, the matrix inversion type determiner 120 may receive interference canceling capability information (ICCI) from the stations 200.

In some embodiments, such interference canceling capability information (ICCI) may be fed back together when channel information (CI) and quality information (QI) of the channel are fed back from the stations 200 (that is, as part of operation S200 of FIG. 3). Further, in some other embodiments, the ICCI may be provided before channel information (CI) and quality information (QI) of the channel are fed back from the stations 200. That is, the time point at which the ICCI of the stations 200 is provided to the access point 100 may be implemented with various modifications as necessary or desirable.

ICCI may mean, for example, capability in which each of the stations 200-1 to 200-$k$ is able to cancel unnecessary noise contained in the channel in the process of communication with the access point 100. Therefore, stations 200 having "good" interference canceling capability may mean stations 200 capable of canceling a relatively large amount of unnecessary noise contained in the channel in the process of communication with the access point 100. Further, stations 200 having "poor" interference canceling capability may mean stations 200 capable of canceling a relatively small amount of unnecessary noise contained in the channel in the process of communication with the access point 100.

Next, it is determined whether the interference canceling capability of the plurality of stations is greater than a threshold value (S420). Further, if the interference canceling capability is greater than the threshold value (S420—Y), a selective matrix inversion is executed (S430, S440), and if the interference canceling capability is smaller than the threshold value (S420—N), a full matrix inversion is executed (S450, S460).

For example, referring to FIGS. 1 and 2, if the interference canceling capability of any given station 200-i or a specific number/specific ones of stations 200 is greater than a threshold value, that is, if it is determined that the interference canceling capability of the station(s) 200-i is good, the matrix inversion type determiner 120 may execute the selective matrix inversion. If interference canceling capability of the station(s) 200-i is smaller than the threshold value, that is, if it is determined that the interference canceling capability of the station(s) 200-i is poor, the matrix inversion type determiner 120 may execute the full matrix inversion.

Specifically, if it is determined that the interference canceling capability of the station(s) 200-i is good, the matrix inversion type determiner 120 may execute a selective matrix inversion which first executes a rank selection for canceling unnecessary ranks according to the rank reduction situation in the channel matrix Hj (S430 of FIG. 4), and then executes the matrix inversion (S440 of FIG. 4). The inversion matrix generated thus may be used for generating a precoder PC.

Next, if it is determined that interference canceling capability of the specific station(s) 200-i is poor, on the contrary to the aforementioned case, the matrix inversion type determiner 120 may first perform executes the matrix inversion on all channel matrices Hj for which the rank selection for canceling the unnecessary or undesirable ranks according to the rank reduction situation is not executed (S450 of FIG. 4). Further, it may execute the rank selection for canceling ranks that are not necessary or desirable according to the rank reduction situation in the generated inversion matrix (S460 of FIG. 4). The inversion matrix generated thus may also be used to generate a precoder PC.

In embodiments herein, an advantage of the methods for generating the inversion matrix differently, depending on the interference canceling capability of the stations 200, is an improvement in the reliability of data communication, and a reduction in packet error rate. Hereinafter, this will be described more specifically with reference to FIGS. 5 to 9.

Figure 5:
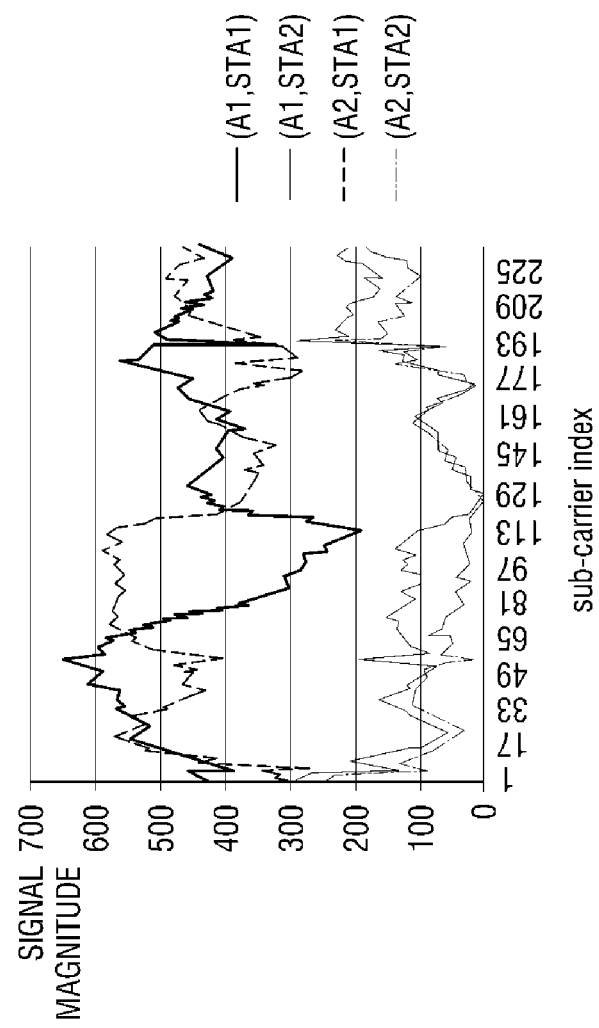
FIG. 5, FIG. 6, FIG. 7 and FIG. 8 are respective diagrams for explaining the matrix inversion process of FIG. 3.

FIG. 5 is a diagram showing an interference signal between adjacent stations, when a precoder is generated with an inversion matrix generated through a selective matrix inversion process, and a data communication is performed using the generated precoder.

Referring to FIG. 5, although magnitude of the signal received by a first antenna A1 of a first station STA1 and a signal received by a second antenna A2 are relatively large, the signal received by the first antenna A1 of the adjacent second station STA2 and the signal received by the second antenna A2 also have non-negligible signal magnitudes. That is, an interference signal exists in the channel.

Figure 6:
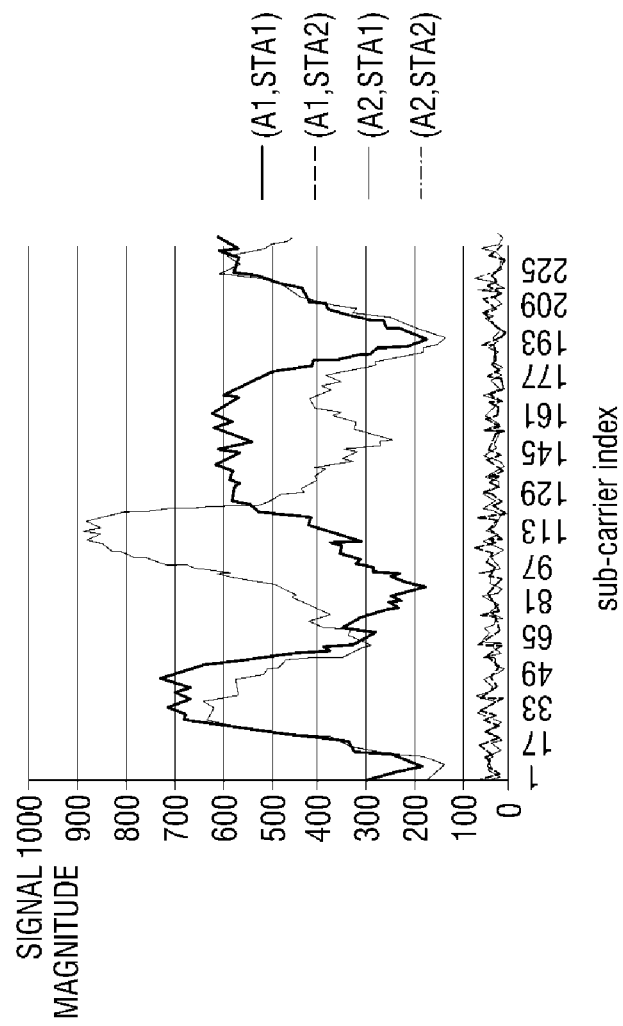

Next, FIG. 6 is a diagram which shows an interference signal between adjacent stations, when a precoder is generated with an inversion matrix generated through a full matrix inversion process and the data communication is performed using the generated precoder.

Referring to FIG. 6, compared to the magnitudes of the signal received by the first antenna A1 of the first station STA1 and the signal received by the second antenna A2, the magnitudes of the signal received by the first antenna A1 of the adjacent second station STA2 and the signal received by the second antenna A2 are small enough to be almost negligible. That is, there is no interference signal in the channel. Looking at the comparison results, it is better to generate a precoder, using the full matrix inversion method in order to minimize the interference signal of the channel.

Figure 7:
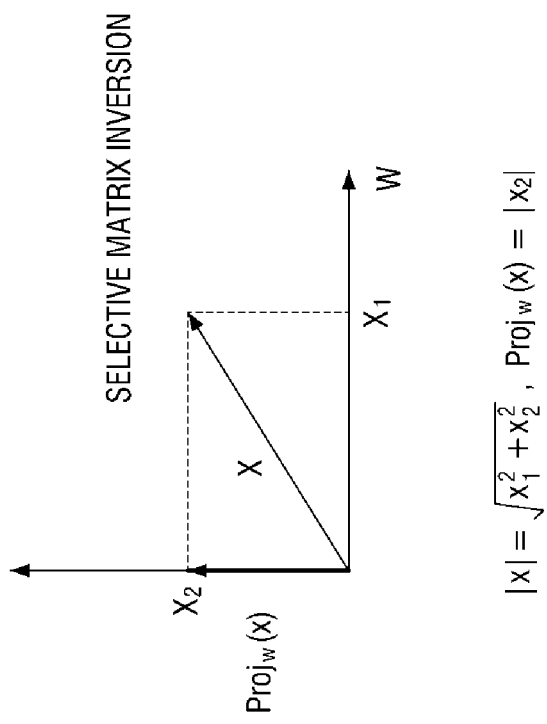
Figure 8:
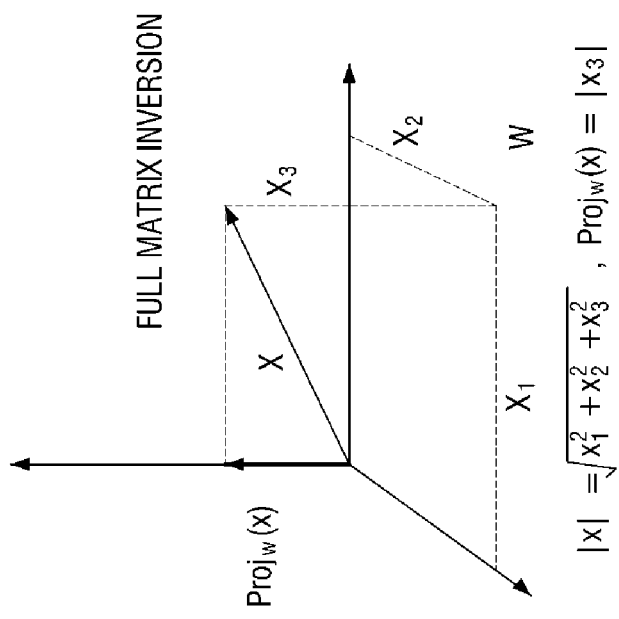

Next, FIG. 7 is a diagram showing a magnitude ($\|\text{Proj}_w(x)\|$) of the data signal, when a precoder is generated with an inversion matrix generated through an selective matrix inversion process, and the data communication is performed using the generated precoder, and FIG. 8 is a diagram showing a magnitude ($\|\text{Proj}_w(x)\|$) of the data signal, when a precoder is generated with the inversion matrix generated through the full matrix inversion process, and the data communication is performed using the generated precoder.

If a null space is generated with the inversion matrix generated through the full matrix inversion process, the interference signal is almost cancelled in the same manner as shown in FIG. 6. However, since the magnitude of the generated inversion matrix is large, the power of the data signal is reduced. This is because the interference is cancelled on the basis of projection as shown in FIGS. 7 and 8, and as the larger the magnitude of matrix is, the smaller the magnitude ($\|\text{Proj}_w(x)\|$) of the data signal after projection is.

Therefore, in the present embodiment, if the interference canceling capability of the stations 200-1 to 200-k is good, the selective matrix inversion that does not cause a large data loss is executed in the communication process. In this case, since the interference signal shown in FIG. 5 may be cancelled by the stations 200-1 to 200-k, the packet error rate is reduced, and since the data loss is not large in the communication process, the reliability of data communication may be improved.

Further, when the interference canceling capability of the stations 200-1 to 200-k is poor, a full matrix inversion in which much interference is cancelled is executed through a precoder. In this case, since the packet error rate is reduced by the generated precoder, the reliability of data communication may be improved.

Referring to FIG. 3 again, it is determined whether a plurality of streams needs to be/should be allocated to one station (S500).

If it is required or desirable to assign a plurality of streams to one station (S500—Y), the decomposition method is selected (S600). If it is not necessary to assign a plurality of streams to one station (S500—N), the decomposition method selection process (S600) is not executed.

Hereinafter, the decomposition method selection process (S600) will be described in more detail with reference to FIGS. 2, 9, and 10.

First, in some embodiments, the memory 140 may store a SVD (Singular Value Decomposition) and GMD (Geometric Mean Decomposition) table corresponding to the transmission modulation and coding scheme (MCS) as shown in FIG. 9. SVD and GMD are examples of selectable types of decomposition for precoding. Such a table is a table in which a decomposition type having better packet reception performance among SVD and GMD is determined depending on the packet reception performance of the station when using a specific transmission modulation and coding scheme (MCS).

In an example, under the transmission modulation and the coding scheme known as "MCS0", since the result of generating a precoder using the GMD and measuring the packet reception performance of the station was better than the result of generating the precoder using the SVD and measuring the packet reception performance of the station, an entry for GMD is written in the "SVD-GMD" column.

Further, under the transmission modulation and the coding scheme known as "MCS3", since the result of generating a precoder using the SVD and measuring the packet reception performance of the station was better than the result of generating a precoder using the GMD and measuring the packet reception performance of the station, SVD is written in the SVD-GMD column. That is, a table shown in FIG. 9 may be obtained through a plurality of simulations.

The decomposition method determiner 130 may select any one of SVD and GMD by referring to the table of FIG. 9 stored in the memory 140, in accordance with the transmission modulation and coding scheme (MCS) determined by the access point 100. When a precoder is generated using the selected decomposition method and data is transmitted using the precoder, the reliability of data communication may be improved.

Next, in some other examples, the memory 140 may store a table which includes data rate information when SVD is selected to generate a precoder under a specific signal to noise ratio (SNR) as shown in FIG. 10, and the data is transmitted using the generated precoder, and data rate information when GMD is selected to generate the precoder and the data is transmitted, using the generated precoder.

The decomposition method determiner 130 may select a decomposition method having a higher data rate between SVD and GMD by referring to the table of FIG. 10 stored in the memory 140 on the basis of the signal to noise ratio fed back from the station. When a precoder is generated using the selected decomposition method and data is transmitted using the precoder, the reliability of data communication can be improved.

Referring again to FIG. 3, a precoder is generated (S700).

In some embodiments, the precoder generator 110 may generate a ZF (Zero Forcing) precoder, using the previously generated inversion matrix and/or the selected decomposition method, through the following Formula 2.

$$P_{ZF} = H_s^H (H_s H_s^H)^{-1} \qquad \text{<Formula 2>}$$

Alternatively, in some embodiments, the precoder generator 110 may generate a MMSE (Minimum Mean Squared Error) precoder, using the previously generated inversion matrix and/or the selected decomposition method through Formula 3 below.

$$P_{MMSE} = H_s^H \left( H_s H_s^H + \frac{N_{rx} \sigma_w^2}{P_{total}} I \right)^{-1} \qquad \text{<Formula 3>}$$

Alternatively, in some embodiments, the precoder generator 110 may generate a BD (Block Diagonalization) precoder applied to the $j^{th}$ station, using the previously generated inversion matrix and/or the selected decomposition method through following Formula 4.

$$P_{BD,j} = \tilde{V}_j^{(0)} V_j^{(b)} \qquad \text{<Formula 4>}$$

(Here, it is assumed that SVD is applied.)

Alternatively, in some embodiments, the precoder generator 110 may generate a G-ZF (Generalized-Zero Forcing) precoder applied to the $j^{th}$ station, using the previously generated inversion matrix and/or the selected decomposition method through following Formula 5.

$$P_{GZF,j} = \hat{Q}_j^{(z)} V_j^{(z)} \qquad \text{<Formula 5>}$$

(Here, it is assumed that SVD has been applied.)

Alternatively, in some embodiments, the precoder generator 110 may generate a G-MMSE (Generalized MMSE) precoder applied to the $j^{th}$ station, using the previously generated inversion matrix and/or the selected decomposition method through following Formula 6.

$$P_{GMMSE,j} = \hat{Q}_j^{(m)} V_j^{(m)} \qquad \text{<Formula 6>}$$

(Here, it is assumed that SVD is applied.)

Next, a method for generating a precoder according to some embodiments of the inventive concept will be described referring to FIG. 11.

Figure 11:
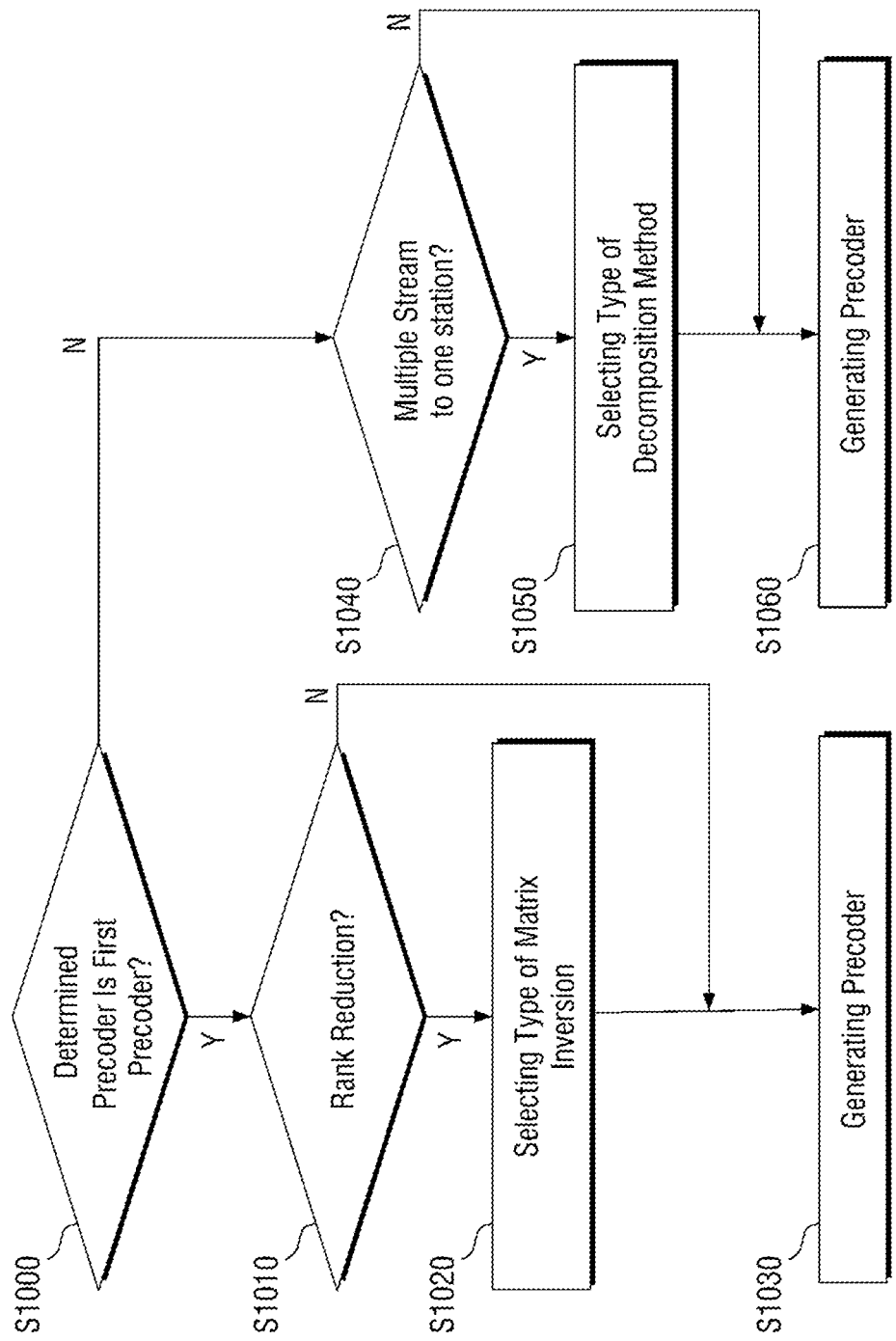
FIG. 11 is a flowchart for explaining a method for generating a precoder according to some embodiments.

FIG. 11 is a flowchart for explaining the method for generating the precoder according to some embodiments. The method of FIG. 11 may be implemented through a processor within AP 100 executing instructions from a memory within AP 100.

Referring to FIG. 11, it is determined whether the determined precoder is a first precoder (S1000).

Here, the first precoder may be distinguished depending on various classifications. In some embodiments, the first precoder may include a ZF precoder or an MMSE precoder described above. In this case, if the determined precoder is the ZF precoder or the MMSE precoder (S1000—Y), it is determined whether a rank reduction is required or desirable (S1010). If the determined precoder is not the ZF precoder or the MMSE precoder (S1000—N), it is determined whether a plurality of streams needs to be/should be allocated to one station (S1040).

Since the process of determining the inversion matrix type depending on whether the rank reduction is required or desirable (S1020) and generating the precoder (S1030) is similar to the process described above, repeated explanations will not be provided.

In addition, since the process of determining the decompression method depending on whether the plurality of streams needs to be/should be allocated to one station as necessary (S1050) and generating a precoder (S1060) is also similar to the aforementioned process, repeated explanations will not be provided.

Although a case where the first precoder includes the ZF precoder or the MMSE precoder has been described as an example above, the embodiments are not limited thereto. That is, types and characteristics of the first precoder may be variously implemented in different manners.

Figure 12:
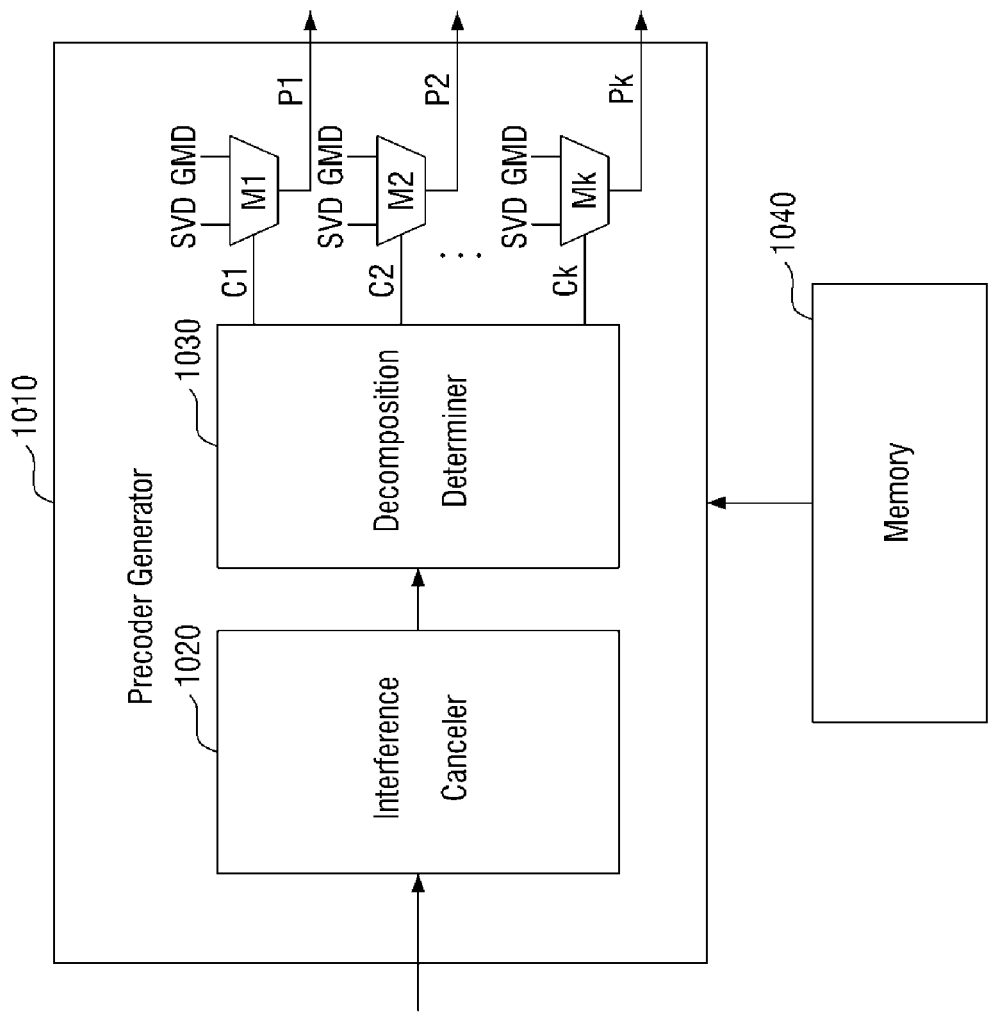
FIG. 12 is a conceptual block diagram of the precoder generator according to some embodiments.

FIG. 12 is a conceptual block diagram of a precoder generator according to some embodiments.

Referring to FIG. 12, a precoder generator 1010 may include an interference canceler 1020, a decomposition determiner 1030, and a plurality of multiplexers M1 to Mk.

The interference eliminator 1020 may cancel the interference of the input signal to generate a null space.

The decomposition determiner 1030 may determine the decomposition method to be applied depending on the method described above. For example, the decomposition determiner 1030 determines one of SVD and GMD referring to FIGS. 9 and 10 stored in the memory 1040 and output the control signals C1 to Ck corresponding thereto.

The plurality of multiplexers M1 to Mk may apply either SVD or GMD to generate precoders P1 to Pk depending on the control signals C1 to Ck that are output from the decomposition determiner 1030.

For example, the multiplexer M1 may apply either SVD or GMD depending on the control signal C1 to generate the precoder P1 to be provided to the station STA1. Further, the multiplexer M2 may apply either SVD or GMD depending on the control signal C2 to generate the precoder P2 to be provided to the station STA2. In this way, the respective multiplexers M1 to Mk may apply either SVD or GMD depending on the respective control signals C1 to Ck to generate the precoders P1 to Pk to be provided to the respective stations STA1 to STAk.

Figure 13:
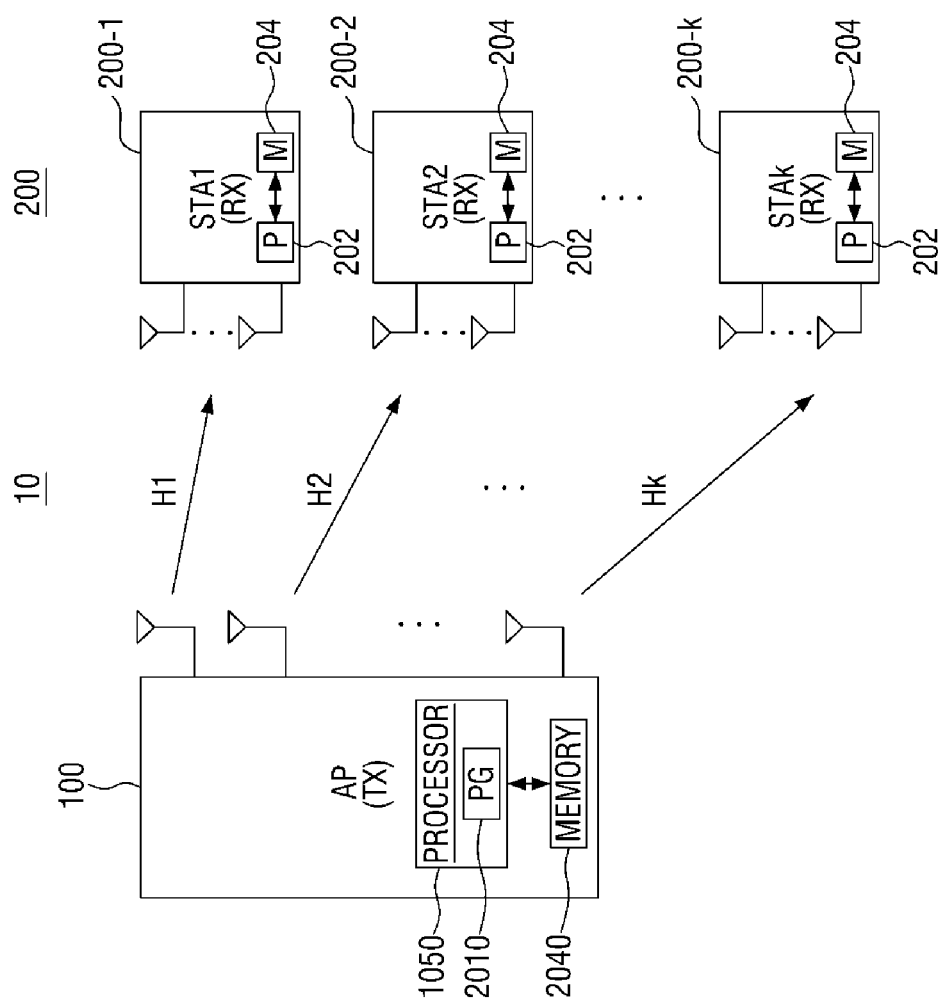
FIG. 13 schematically illustrates example circuitry that may be included within an application processor and stations of a communication system according to an embodiment.

FIG. 13 schematically illustrates example circuitry that may be included within the access point (AP) 100 and the stations 200 of the communication system 10. Stations 200 may each include a processor 202 coupled to a memory 204. The processor 202 of any station 200-*i* may control the overall operations of that station 200-*i*. AP 100 may include a processor 1050, which includes a precoder generator 2010 and which may control the overall operations of the AP 100. The precoder generator 2010 may be either the precoder generator 1010 of FIG. 12 or the precoder generator 110 of FIG. 2. The AP 100 further includes a memory 2040, e.g., either the memory 1040 or 140 of FIGS. 12 and 2, respectively, which is coupled to processor 1050. Processor 1050 may execute instructions read from the memory 2040, and store interim data in the memory 2040, to carry out the above-described operations that are performed by AP 100. Similarly, the respective processors 202 of each of the stations 200 may read instructions from a respective memory 204 to implement the operations performed by the respective stations 200.

Exemplary embodiments of the inventive concept have been described herein with reference to signal arrows, block diagrams (e.g., the flowcharts of FIGS. 3, 4 and 11 or the blocks of FIGS. 2 and 12) and algorithmic expressions. Each block of the block diagrams, combinations of blocks in the block diagrams, and operations according to the algorithmic expressions can be implemented by hardware (e.g., processing circuitry of AP 100 or in any of the stations 200 in cooperation with memory 2040 or 204) accompanied by computer program instructions. Such computer program instructions may be stored in a non-transitory computer readable medium (e.g. memory 2040 or 204) that can direct a computer, other programmable data processing apparatus, or other devices to function in a particular manner, such that the instructions stored in the computer readable medium produce an article of manufacture including instructions which implement the function/act specified in the block diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

In concluding the detailed description, those skilled in the art will appreciate that many variations and modifications may be made to the disclosed embodiments without substantially departing from the principles of the present inventive concept. Therefore, the disclosed embodiments are used in a generic and descriptive sense only and not for purposes of limitation.

What is claimed is:

1. An access point for communicating with a plurality of stations in a multi user multiple input and multiple output (MU MIMO) communication system, the access point comprising:
    at least one processor configured to execute instructions to implement operations comprising:
    receiving channel information and quality information of a channel from a plurality of stations;
    determining whether a first condition is satisfied on the basis of the received channel information and quality information;
    when the first condition is satisfied, selecting a type of matrix inversion from among a plurality of matrix inversion types for precoding, and generating a precoder based at least in part on the selection;
    when the first condition is not satisfied, generating a precoder without selecting a type of matrix inversion from among the plurality of matrix inversion types;
    determining whether a second condition different from the first condition is satisfied on the basis of the received information;
    when the second condition is satisfied, selecting a type of decomposition from among a plurality of decomposition types for precoding, and generating a precoder based at least in part on the selection of the type of decomposition, and when the second condition is not satisfied, generating a precoder without selecting the type of decomposition from among the plurality of decomposition types.

2. The access point for communicating with a plurality of stations of claim 1, wherein said determining whether the first condition is satisfied comprises:
    receiving channel information and quality information of the channel from at least some of the plurality of stations to determine a number of streams to be provided to the plurality of stations, and determining whether a rank reduction is required or desirable on the basis of the determined number of streams.

3. The access point for communicating with a plurality of stations of claim 2, wherein said selecting the type of matrix inversion comprises:
    receiving interference canceling capability information from the plurality of stations; and
    selecting the type of matrix inversion on the basis of interference canceling capabilities of the plurality of stations.

4. The access point for communicating with a plurality of stations of claim 3, wherein the operations further comprise:
    executing a selective matrix inversion if the interference canceling capability satisfies a predetermined standard; and
    executing a full matrix inversion if the interference canceling capability does not satisfy a predetermined standard.

5. The access point for communicating with a plurality of stations of claim 4, wherein said executing the selective matrix inversion comprises:
    after executing a rank selection according to the rank reduction,
    executing a matrix inversion on the rank-selected matrix.

6. The access point for communicating with a plurality of stations of claim 4, wherein said executing the full matrix inversion comprises:
    after executing an inversion on a full matrix in which a rank selection is not performed, executing a rank selection according to the rank reduction on a full matrix in which the inversion is executed.

7. The access point for communicating with a plurality of stations of claim 1, wherein said determining whether the second condition is satisfied comprises:
determining a number of streams to be provided to the plurality of stations on the basis of the received information, and determining whether a plurality of streams needs to be or should be applied to any one station of the plurality of stations.

8. The access point for communicating with a plurality of stations of claim 7, wherein said selecting the decomposition type comprises:
determining a modulation and coding scheme (MCS) on the basis of the received information; and
determining a decomposition type to be used for generating the precoder, on the basis of the modulation and coding scheme.

9. The access point for communicating with a plurality of stations of claim 7, wherein said selecting the decomposition type comprises:
determining a decomposition type to be used for generating the precoder, on the basis of the quality information of the channel.

10. The access point for communicating with a plurality of stations of claim 7, wherein said selecting the decomposition type comprises:
selecting either a SVD (Singular Value Decomposition) or a GMD (Geometry Mean Decomposition).

11. An access point for communicating with a plurality of stations in a multi user multiple input and multiple output (MU MIMO) communication system, the access point comprising:
at least one processor configured to execute instructions to implement operations comprising:
receiving channel information and quality information of a channel from a plurality of stations to determine a number of streams to be provided to the plurality of stations;
determining whether a rank reduction is to be implemented on the basis of the determined number of streams;
when the rank reduction is to be implemented, selecting a generating method of an inversion matrix for generation of a precoder on the basis of interference canceling capability information (ICCI) of the plurality of stations; and
when the rank reduction is not to be implemented, generating the precoder without selecting an inversion matrix on the basis of ICCI.

12. The access point for communicating with a plurality of stations of claim 11, wherein the selecting of the generating method of the inversion matrix for generation of the precoder on the basis of interference canceling capability information of the plurality of stations comprises:
comparing interference canceling abilities of the plurality of stations with a predetermined standard to select an execution order of a rank selection according to the rank reduction, and a matrix inversion.

13. The access point for communicating with a plurality of stations of claim 12, wherein said comparing the interference canceling abilities of the plurality of stations with the predetermined standard to select the execution order of the rank selection according to the rank reduction, and the matrix inversion comprises:
first executing the rank selection according to the rank reduction, if the interference canceling capabilities of the plurality of stations satisfy a predetermined standard; and
executing the rank selection according to the rank reduction later, if the interference canceling capabilities of the plurality of stations do not satisfy the predetermined standard.

14. The access point for communicating with a plurality of stations of claim 13, wherein the operations further comprise:
generating a ZF (Zero Forcing) precoder, using the generated inversion matrix.

15. The access point for communicating with a plurality of stations of claim 13, wherein the operations further comprise:
generating an MMSE (Minimum Mean Squared Error) precoder, using the generated inversion matrix.

16. An access point that generates a precoder of a multi user multiple input and multiple output communication system, the access point comprising:
at least one processor configured to execute instructions to implement operations comprising:
receiving channel information and quality information of a channel from a plurality of stations;
determining a number of streams to be provided to the plurality of stations, and a modulation and coding scheme (MCS), on the basis of the received information;
when a plurality of streams are to be allocated to any one of the plurality of stations, selecting a decomposition type to be used for generation of a precoder, on the basis of at least one of the quality information of the channel and the MCS; and
when a plurality of streams are not to be allocated to any one of the plurality of stations, generating the precoder without selecting the decomposition type on the basis of at least one of the quality information of the channel and the MCS.

17. The access point that generates a precoder of claim 16, wherein said determining the decomposition type comprises:
determining either a SVD (Singular Value Decomposition) or a GMD (Geometric Mean Decomposition).

18. The access point that generates a precoder of claim 17, wherein said determining the decomposition type comprises determining either SVD or GMD on the basis of the modulation and coding scheme.

19. The access point that generates a precoder of claim 17, wherein the quality information of the channel comprises a SNR (Signal to Noise Ratio) of the channel, and
said determining the decompression type comprises determining either SVD or GMD on the basis of the SNR of the channel.

20. The access point that generates a precoder of claim 16, wherein the operations further comprise:
generating one of a BD (Block Diagonalization) precoder, a G-ZF (Generalized-Zero Forcing) precoder and a G-MMSE (Generalized MMSE) precoder, using the determined decomposition type.

* * * * *